United States Patent [19]

Bogaerts et al.

[11] Patent Number: 5,041,785
[45] Date of Patent: Aug. 20, 1991

[54] DEVICE FOR MEASURING A RELATIVE DISPLACEMENT OF TWO OBJECTS, INCLUDING A MAGNETIC SCALE AND TWO MUTUALLY PERPENDICULAR MAGNETIC SENSORS WHICH PRODUCE TWO INDEPENDENT PHASE DISPLACED SIGNALS

[75] Inventors: Johannes L. G. M. Bogaerts; Eduard Camerik, both of Eindhoven, Netherlands

[73] Assignee: U.S. Philips Corporation, New York, N.Y.

[21] Appl. No.: 501,445

[22] Filed: Mar. 28, 1990

[30] Foreign Application Priority Data

Mar. 28, 1989 [NL] Netherlands ............... 8900750

[51] Int. Cl.[5] ............ G01B 7/14; G01N 27/72; G01R 33/12
[52] U.S. Cl. ............ 324/207.24; 324/207.13; 324/207.15; 324/207.21; 324/207.23; 324/207.25; 324/233
[58] Field of Search ......... 324/207.11, 207.13, 324/207.15, 207.21, 207.23, 207.24, 207.25, 233

[56] References Cited

U.S. PATENT DOCUMENTS 4,079,360  3/1978  Ookubo et al. ............... 324/252
4,506,220  3/1985  Sawada et al. ............... 324/252
4,922,187  5/1990  Juds et al. ............... 324/207.21

Primary Examiner—Walter E. Snow

[57] ABSTRACT

The device comprises on the one hand an elongate scale (7) consisting of a succession of magnetic north poles and south poles, and on the other hand a measuring head (9) with at least a first and a second magnetic field sensor (21, 23) which are subjected to the effect of a magnetic field which alternates as a function of time due to the alternating passage of north poles and south poles during a displacement (15) of the scale in its longitudinal direction with respect to the measuring head. The two magnetic field sensors (21, 23) are arranged so that they are always situated opposite one and the same point on the scale (7), the first sensor (21) being sensitive to variations in the magnetic field component extending parallel to the longitudinal direction of the scale (7), the second sensor (23) being sensitive to variations in the component extending parallel to the connecting line (19) between the scale (7) and the measuring head (9). Because the points where the direction of these magnetic field components is reversed correspond to different points on the scale (7), the output signals of the two sensors (21, 23) are phase-shifted with respect to one another, so that the direction of the displacement can be readily determined.

4 Claims, 3 Drawing Sheets

DEVICE FOR MEASURING A RELATIVE DISPLACEMENT OF TWO OBJECTS, INCLUDING A MAGNETIC SCALE AND TWO MUTUALLY PERPENDICULAR MAGNETIC SENSORS WHICH PRODUCE TWO INDEPENDENT PHASE DISPLACED SIGNALS

BACKGROUND OF THE INVENTION

1. Field of the Invention

The invention relates to a device for determining the magnitude and the direction of a relative displacement of two objects, comprising on the one hand an elongate scale which is provided on the first object and which extends in the direction of displacement, which scale consists of a succession of magnetic north poles and south poles, and on the other hand a measuring head which is provided on the second object and which comprises at least a first and a second magnetic field sensor which are arranged with respect to the scale so that under the influence of the alternating passage of north poles and south poles due to the relative displacement they are exposed to a magnetic field which alternates as a function of time and which causes an output signal in each of the sensors, the output signals of the two sensors varying in substantially the same way as a function of time but being phase-shifted with respect to one another.

2. Art Background

A device of the type referred to above is known from GB-A 1,492,980. Such devices can be used, for example for measuring linear displacements in which case the scale extends along a straight line, or for measuring the speed of revolution and direction of a wheel, in which case the scale extends along the circumference of the wheel. As is described with reference to FIG. 3 of GB-A 1,492,980, the extent and the direction of the relative displacement can be simply determined from the phase-shifted output signals of the sensors. In order to ensure that the signals of the two sensors are phase-shifted, in the known device the sensors are arranged so that the second sensor has been shifted with respect to the first sensor over an accurately defined distance, depending on $\lambda$, in the longitudinal direction of the scale, where $\lambda$ is the distance between two homonymous poles of the scale. Therefore, the magnetic poles must be provided at exactly the same distances from one another on the scale and the distance between the two sensors must be accurately adjusted and exactly adapted to $\lambda$. Consequently, the manufacture of the known device is complex and expensive. It is a further drawback of the known measuring head that its dimension in the longitudinal direction of the scale is comparatively large.

SUMMARY OF THE INVENTION

It is an object of the invention to provide a device of the kind set forth in which the distance between the successive pole pairs on the scale need not be accurately known and need not even be exactly constant over the length of the scale, and in which the measuring head can have an extremely compact construction.

To achieve this, the device in accordance with the invention is characterized in that the first and the second magnetic field sensor are arranged so that they are always situated opposite the same point on the scale, the first sensor being sensitive mainly to variations in the component of the magnetic field which extends parallel to the longitudinal direction of the scale, the second sensor being sensitive mainly to variations in the component of the magnetic field which extends perpendicularly to the longitudinal direction of the scale and parallel to the connecting line between the scale and the measuring head.

When the scale is curved (for example, in order to follow the circumference of a wheel), its longitudinal direction is to be understood to mean the tangent to the scale in the point directly opposite the measuring head. When successive pole pairs pass the measuring head, the direction of the component of the magnetic field extending parallel to the longitudinal direction of the scale (to be referred to hereinafter as the parallel component) and the direction of the other said component (referred to hereinafter as the perpendicular component) are periodically reversed. This reversal takes place opposite points of the scale which are spaced a distance of $\lambda/4$ apart for the parallel and the perpendicular component. Consequently, the output signals of the two sensors exhibit the desired phase difference without the sensors being arranged at a distance from one another which depends on the period of the scale. Because both sensors are situated opposite the same point on the scale (which is desirable in order to achieve the phase difference in conformity with the foregoing), the construction of the measuring head can be very compact.

A first embodiment of the device in accordance with the invention is characterized in that the magnetic field sensors are formed by elongate, magnetoresistive elements which extend in mutually perpendicular directions in a plane parallel to the longitudinal direction of the scale.

An alternative version of said first embodiment is characterized in that for the premagnetization of the first and the second sensor there is provided a common premagnetizing device which generates a substantially constant magnetic field which is oriented mainly perpendicularly to the longitudinal direction of the scale and to the connecting line between the scale and the measuring head.

A second embodiment of the device in accordance with the invention is characterized in that the first and the second magnetic field sensor are formed by a first and a second solenoid coil, respectively, whose axes extend mutually perpendicularly, the axis of the first coil extending substantially parallel to the longitudinal direction of the scale, the axis of the second coil extending substantially parallel to the connecting line between the scale and the measuring head.

BRIEF DESCRIPTION OF THE DRAWINGS

The invention will be described in detail hereinafter with reference to the drawing.

DETAILED DESCRIPTION OF THE PREFERRED EMBODIMENTS

Figure 1:
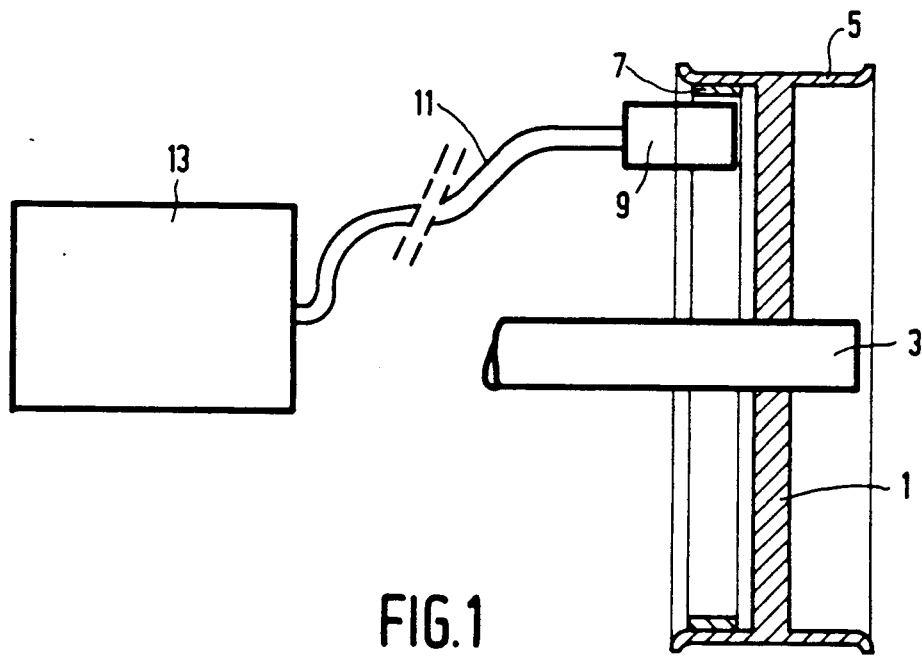
FIG. 1 diagrammatically shows a device in accordance with the invention.

FIG. 1 diagrammatically shows a device for measuring the speed and direction of revolution of a wheel 1 of a vehicle which is mounted on a shaft 3. On the inner side of the rim 5 of the wheel 1 (for example, the wheel of a car) there is provided an elongate scale which follows the circumference of the wheel, using for example a suitable glue. The scale 7 consists of a strip-shaped carrier of a flexible material on which or in which there is provided an alternation of magnetic north poles and magnetic south poles which extends in the longitudinal direction of the carrier. Such magnetic scales are known per se.

Opposite the scale 7 there is arranged a measuring head 9 which is secured to the wheel suspension of the vehicle (not shown), so that the magnetic poles of the scale 7 successively pass the measuring head during revolution of the wheel 1. As will be described in detail hereinafter, the measuring head 9 comprises magnetic field sensors which will be exposed to the influence of an alternating magnetic field due to the alternating passage of the magnetic north poles and south poles. Via a cable 11, the measuring head 9 is electrically connected to a processing device 13 which is accommodated in a suitable location in the vehicle and which serves to process the output signals produced by the measuring head. The processing device 13 may comprise a known circuit, for example a circuit as described with reference to FIG. 3 of GB-A 1,492,980.

Figure 2A:
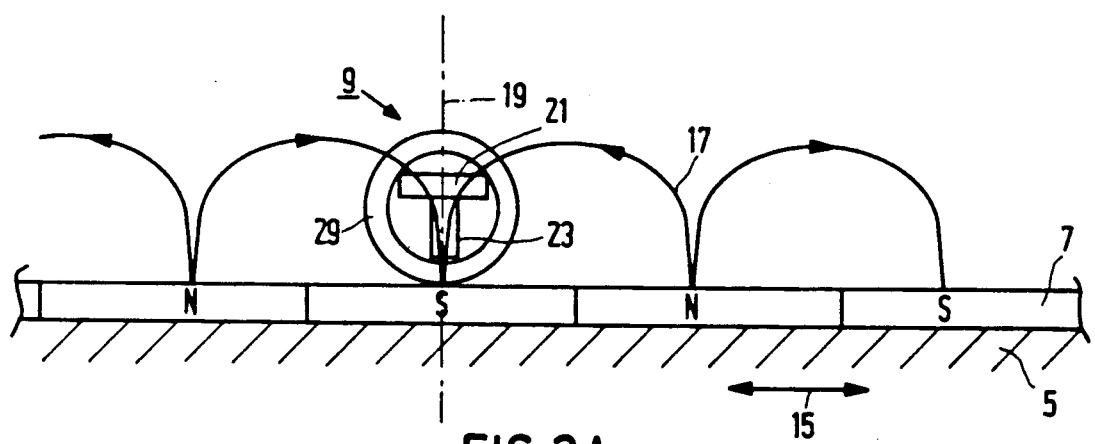
FIGS. 2A and 2B are a side elevation and a plan view, respectively, of parts of a first embodiment of the device in accordance with the invention.
Figure 2B:
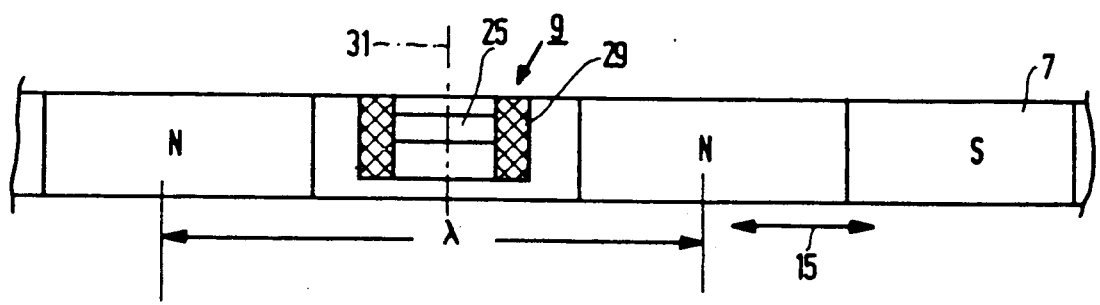

FIGS. 2A and 2B are a detailed view of a part of the scale 7 and a part of the measuring head 9. In these Figures the scale 7 is shown to extend according to a straight line instead of a circle like in FIG. 1. This is done because, for the purpose of explanation of the invention, the part of the scale 7 which is situated directly opposite the measuring head 9 may be considered to be approximately straight (coincident with the tangent to said circle at the area of the measuring head 9). Moreover, the device in accordance with the invention is suitable for measuring linear relative displacements (where the scale 7 actually extends according to a straight line) as well as for measuring rotations. The displacement of the rim 5 with the scale 7 with respect to the measuring head 9 is denoted by a double arrow 15 in the FIGS. 2A and 2B. The magnetic north poles and south poles are denoted by the letters N and S, respectively. Moreover, FIG. 2A shows some magnetic lines of force 17 for an approximate indication of the shape of the magnetic field in the vicinity of the measuring head 9. It is clearly shown that in the immediate vicinity of a magnetic pole the magnetic field extends substantially perpendicularly to the longitudinal direction of the scale 7 and parallel to the connecting line 19 between the scale and the measuring head 9. At the area of a magnetic south pole S the magnetic field is oriented towards the scale 7, and at the area of a north pole N it is oriented away from the scale. Approximately halfway between a north pole and a south pole the magnetic field is oriented substantially parallel to the longitudinal direction of the scale, the direction extending each time from the nearest north pole to the nearest south pole. In the vicinity of other points on the scale 7 the magnetic field is composed of a component oriented in accordance with the connecting line 19 (the perpendicular component) and a component oriented parallel to the longitudinal direction of the scale (the parallel component). When the distance between two homonymous magnetic poles of the scale 7 is referred to as $\lambda$ the direction of the perpendicular component as well as that of the parallel component of the magnetic field will be reversed after a travel of $\lambda/2$ along the scale, the reversing points of the component being offset a distance $\lambda/4$ with respect to the reversing points of the perpendicular component.

The measuring head 9 comprises two magnetic field sensors, the first sensor being sensitive mainly to variations in the parallel component of the magnetic field whilst the second sensor is sensitive mainly to variations in the perpendicular component. In the embodiment shown in the FIGS. 2A and 2B these sensors are formed by a first magnetoresistive element 21 and a second magnetoresistive element 23, respectively.

Figure 3:
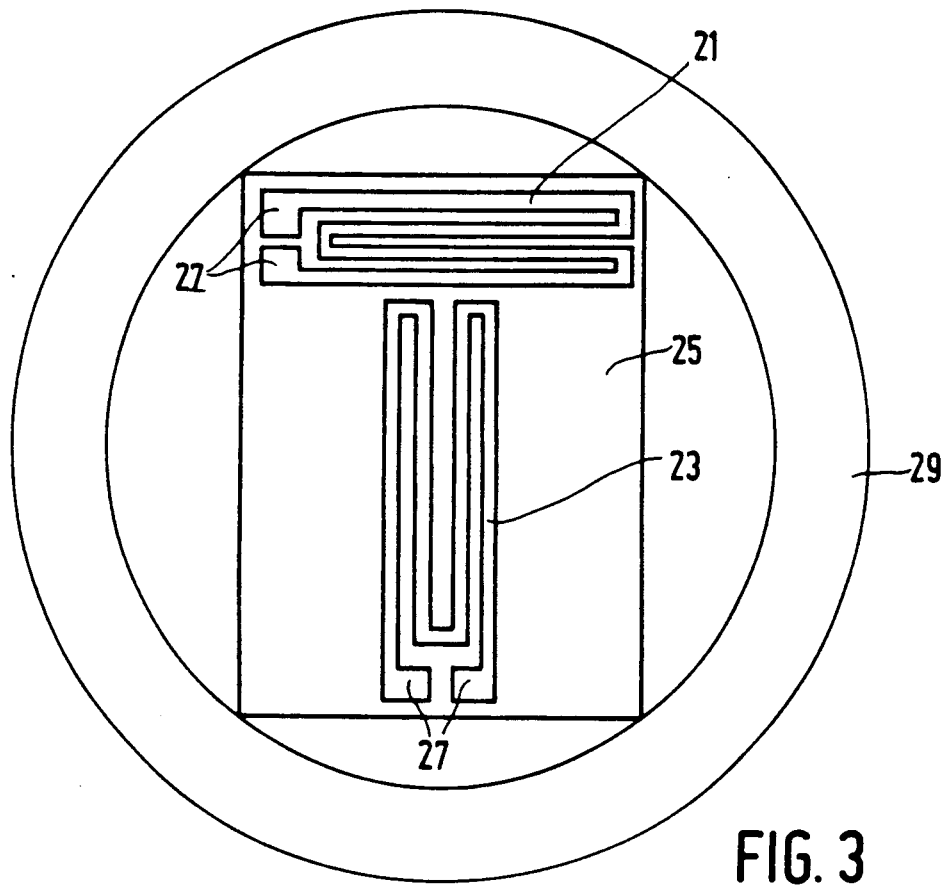
FIG. 3 shows the measuring head of the embodiment shown in the FIGS. 2A and 2B at an increased scale.

FIG. 3 shows the two magnetoresistive elements at an increased scale. They consist of a thin layer of ferromagnetic material, having an anisotropic magnetoresistivity, for example nickel-cobalt, provided on an electrically insulating substrate 25, for example a glass plate, which extends parallel to the longitudinal direction of the scale in the operating condition. The two magnetoresistive elements 21, 23 are formed from the thin layer of magnetoresistive material, for example by etching. Each of these elements consists of a number of parallel, adjacent elongate strips with short transverse connections at the ends, thus forming a meander-shaped element. At the free ends of the first and the last strip there are formed connection pads 27 whereto connection wires are connected (not shown). The longitudinal directions of the two magnetoresistive elements 21 and 23 (i.e. the longitudinal directions of the strips constituting these elements) extend perpendicularly to one another.

The substrate 25 with the two magnetoresistive elements 21 and 23 is surrounded by a solenoid coil 29 whose axis 31 (see FIG. 2B) extends perpendicularly to the longitudinal direction of the scale 7 and perpendicularly to the connecting line 19 between the scale and the measuring head 9 and which is connected to a d.c. source (not shown), so that the coil generates a constant magnetic field, oriented along the axis of the coil and hence perpendicularly to the substrate, in order to premagnetize the two magnetic field sensors. As a result, for these sensors an optimum sensitivity is achieved to variations in the magnetic field component oriented in their respective longitudinal direction, whilst they are substantially insensitive to variations in a magnetic field component oriented perpendicularly to their respective longitudinal direction. The premagnetization device formed by the current source and the coil 29 may be replaced, if desired, by a premagnetization device consisting of a permanent magnet.

Figure 4A:
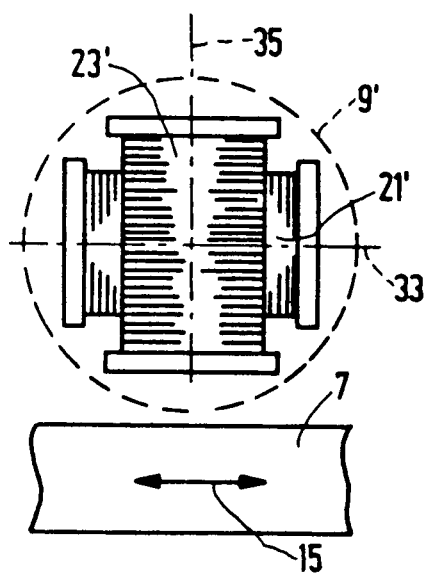
FIGS. 4A and 4B are a side elevation and a plan view, respectively, of parts of a second embodiment of the device in accordance with the invention.
Figure 4B:
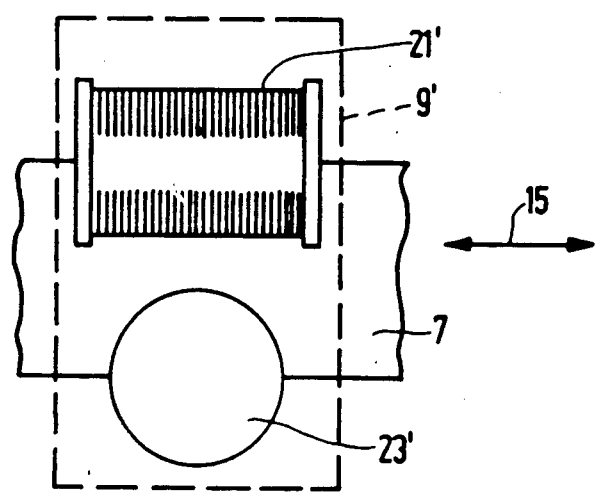

FIGS. 4A and 4B show the principle of the construction of a second embodiment in which each of the magnetic field sensors 21' and 23' is formed by a solenoid coil. As is known, an electric voltage is induced in a coil when the magnetic flux enclosed by the coil changes. Because the space enclosed by a solenoid coil forms a comparatively long, narrow cylinder, an electric voltage is induced in such a coil when the component of the magnetic field extending parallel to the axis of the coil is changed as regards magnitude or direction. As appears from the FIGS. 4A and 4B, the two solenoid coils 21' and 23' are arranged so that the axis 33 of the first coil 21' extends parallel to the longitudinal direction of the scale 7 so that this coil is sensitive to variations in the parallel component of the magnetic field. The axis 35 of the second coil 23' coincides with the connecting line between the scale 7 and the measuring head 9' (denoted by a broken line), so that this coil is sensitive to the variations in the perpendicular component of the magnetic field.

Figure 5A:
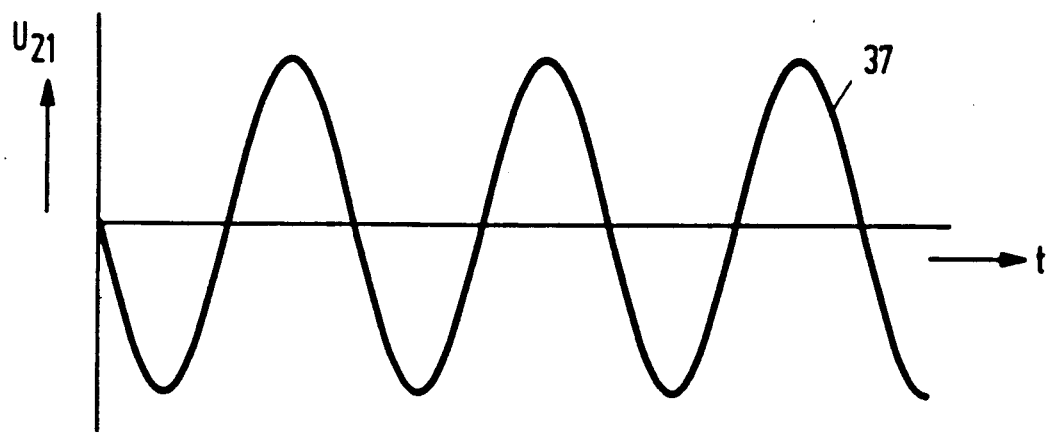
FIGS. 5A and 5B are graphic representations of the output signals of the measuring head of the device in accordance with the invention.
Figure 5B:
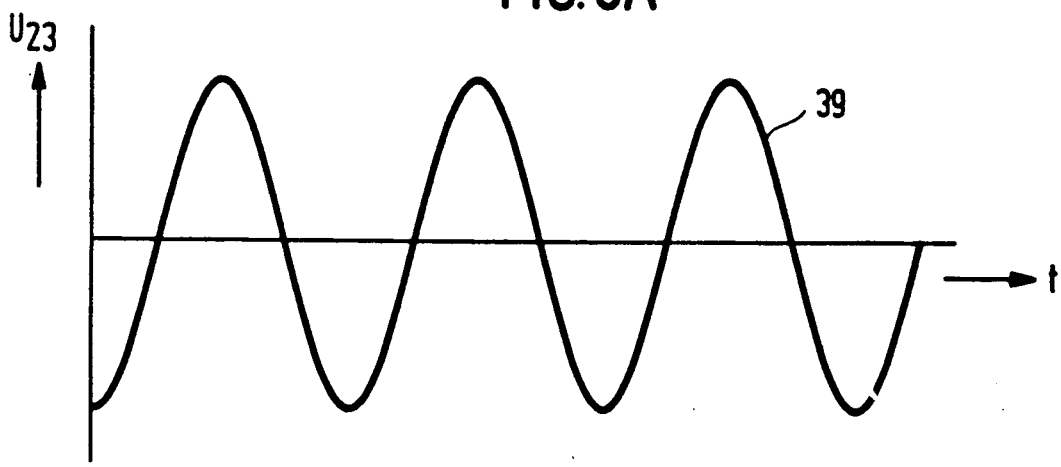

When the scale 7 is displaced at a constant speed amounting to v m/s with respect to the measuring head 9, 9' in the direction of the arrow 15, the perpendicular component as well as the parallel component of the magnetic field varies sinusoidally with a frequency $v/\lambda$ at the area of the magnetic head, so that each of the two magnetic field sensors 21 and 23 (or 21' and 23') produces a sinusoidal output signal. Because the reversing points of one magnetic field component are offset a distance $\lambda/4$ with respect to the reversing points of the other component, the output signals of the two magnetic field sensors will exhibit a mutual phase difference amounting to $\pi/2$. FIG. 5 shows an example of the output signals of the sensors 21 and 23 as a function of time t. The curve 37 represents the output voltage U21 of the first sensor 21 and the curve 39 represents the output voltage U23 of the second sensor 23. These output voltages are obtained when, in the situation shown in FIG. 2A, the scale is displaced to the left at a constant speed with respect to the measuring head 9. When the scale moves to the right, the signal U21 is shifted one half period along the time axis, the signal U23 not being changed. The processing device 13 can calculate the speed and direction of displacement from these signals, even when the speed is not constant and hence the voltages U21 and U23 are not purely sinusoidal.

We claim:

1. A device for determining the magnitude and the direction of a relative displacement of two objects, comprising on the one hand an elongate scale which is provided on the first object and which extends in the direction of displacement, which scale consists of a plurality of alternating magnetic north and south poles, and on the other hand a measuring head which is provided on the second object and which comprises at least first and second, electrically unconnected, magnetic field sensors which are arranged with respect to the scale so that under the influence of the passage of the alternating north poles and south poles due to the relative displacement they are exposed to a magnetic field which alternates as a function of time and which causes an output signal in each of the sensors, the output signals of the two sensors varying in substantially the same way as a function of time but being phase-shifted with respect to one another, characterized in that the first and second magnetic field sensors are arranged so that they are always situated opposite the same point on the scale, the first sensor being sensitive mainly to variations in the component of the magnetic field which extends parallel to the longitudinal direction of the scale, the second sensor being sensitive mainly to variations in the component of the magnetic field which extends perpendicularly to the longitudinal direction of the scale and parallel to the connecting line between the scale and the measuring head.

2. A device as claimed in claim 1, characterized in that the magnetic field sensors are formed by elongate, magnetoresistive elements which extend in mutually perpendicular directions in a plane parallel to the longitudinal direction of the scale.

3. A device as claimed in claim 2, further comprising means for premagnetizing said first and second sensors, said means producing a substantially constant magnetic field which is oriented mainly perpendicularly to the longitudinal direction of the scale and to the connecting line between the scale and the measuring head.

4. A device as claimed in claim 1, characterized in that the first and the second magnetic field sensors are formed by a first and a second solenoid coil, respectively, whose axes extend mutually perpendicularly, the axis of the first coil extending substantially parallel to the longitudinal direction of the scale, the axis of the second coil extending substantially parallel to the connecting line between the scale and the measuring head.

* * * * *